(12) United States Patent
Tyink

(10) Patent No.: US 11,707,027 B2
(45) Date of Patent: Jul. 25, 2023

(54) HYDROPONIC GROW ASSEMBLY

(71) Applicant: Fork Farms Holdings, LLC, Appleton, WI (US)

(72) Inventor: Alexander R. Tyink, Appleton, WI (US)

(73) Assignee: Fork Farms Holdings, LLC, Appleton, WI (US)

(*) Notice: Subject to any disclaimer, the term of this patent is extended or adjusted under 35 U.S.C. 154(b) by 139 days.

(21) Appl. No.: 17/108,671

(22) Filed: Dec. 1, 2020

(65) Prior Publication Data

US 2021/0161091 A1 Jun. 3, 2021

Related U.S. Application Data

(60) Provisional application No. 62/942,571, filed on Dec. 2, 2019.

(51) Int. Cl.
| | |
|---|---|
| *A01G 31/06* | (2006.01) |
| *F21S 4/28* | (2016.01) |
| *F21Y 107/30* | (2016.01) |
| *A01G 31/00* | (2018.01) |

(52) U.S. Cl.
CPC ............... *A01G 31/06* (2013.01); *F21S 4/28* (2016.01); *A01G 2031/006* (2013.01); *F21Y 2107/30* (2016.08)

(58) Field of Classification Search
CPC ... A01G 9/023; A01G 2031/006; A01G 31/06
See application file for complete search history.

(56) References Cited

U.S. PATENT DOCUMENTS

| | | | |
|---|---|---|---|
| 922,888 | A | 5/1909 | Grunwaldt |
| D172,090 | S | 5/1954 | Du Pree |
| 4,065,876 | A | 1/1978 | Moffett, Jr. |
| 4,218,847 | A | 8/1980 | Leroux |
| 4,231,189 | A | 11/1980 | Hochberg |
| 4,250,666 | A | 2/1981 | Rakestraw |
| 4,594,811 | A | 6/1986 | Tokoro |

(Continued)

FOREIGN PATENT DOCUMENTS

| | | |
|---|---|---|
| CA | 2947608 | 11/2015 |
| CN | 203907419 U | 10/2014 |

(Continued)

OTHER PUBLICATIONS

Spacesaver Corporation "Cannabis Vertical Grow System" Jan. 1, 2019. Retrieved from the Internet on Jan. 20, 2021 URL: http://www.spacesaver.com/grow (10 pages).

*Primary Examiner* — Monica L Perry
(74) *Attorney, Agent, or Firm* — Padda Law Group

(57) ABSTRACT

A hydroponic grow assembly including an assembly base and at least one plant structure removably connectable to the assembly base to form a plant wall for growing plants. The plant structure includes a plurality of plant wells opened to a root chamber and the base includes a bottom structure enclosed by a perimeter wall to form an inner cavity of a reservoir tank to supply water to the root chamber of the plant structure. The bottom structure includes a support feature within the inner cavity of the reservoir tank to support the at least one plant structure in an upright position to form the plant wall of the assembly.

13 Claims, 17 Drawing Sheets

(56) References Cited

U.S. PATENT DOCUMENTS

| | | | |
|---|---|---|---|
| 4,756,120 A | 7/1988 | Arledge | |
| 4,920,695 A | 5/1990 | Garden | |
| 5,130,091 A | 7/1992 | Saceman | |
| 5,159,779 A | 11/1992 | Johnson | |
| 5,224,291 A | 7/1993 | Sheffield | |
| 5,265,376 A | 11/1993 | Less | |
| D352,581 S | 11/1994 | Fredericks | |
| 5,363,594 A | 11/1994 | Davis | |
| 5,397,382 A * | 3/1995 | Anderson | F24F 8/175 47/65.5 |
| 5,555,676 A | 9/1996 | Lund | |
| D399,788 S | 10/1998 | Wagner | |
| 6,021,602 A | 2/2000 | Orsi | |
| 6,178,692 B1 | 1/2001 | Graven | |
| 6,276,089 B1 | 8/2001 | Boisclair et al. | |
| 6,408,570 B1 | 6/2002 | Shih | |
| 6,477,805 B2 | 11/2002 | Ware | |
| 6,604,321 B2 | 8/2003 | Marchildon | |
| 6,615,542 B2 | 9/2003 | Ware | |
| 6,669,314 B1 | 12/2003 | Nemec et al. | |
| 6,904,715 B1 | 6/2005 | Lawton | |
| 7,080,482 B1 | 7/2006 | Bradley | |
| 7,143,544 B2 | 12/2006 | Roy | |
| 7,536,829 B2 | 5/2009 | Genma | |
| 7,549,250 B2 | 6/2009 | Feuz | |
| 7,644,537 B1 * | 1/2010 | Hui | A01G 27/006 47/79 |
| 7,770,323 B2 | 8/2010 | Kim | |
| 7,832,144 B2 | 11/2010 | Corradi | |
| D631,683 S | 2/2011 | Ash et al. | |
| 7,877,927 B2 | 2/2011 | Roy et al. | |
| D638,743 S | 5/2011 | Bouchard et al. | |
| 8,365,466 B1 | 2/2013 | Storey | |
| 8,516,743 B1 | 8/2013 | Giacomantonio | |
| 8,578,651 B1 | 11/2013 | Giacomantonio | |
| D719,055 S | 12/2014 | Tyink | |
| 9,169,069 B2 | 10/2015 | Servant et al. | |
| 9,374,952 B1 | 6/2016 | Cross | |
| 9,814,186 B2 | 11/2017 | Anderson et al. | |
| 9,974,243 B2 | 5/2018 | Martin | |
| 10,111,394 B2 | 10/2018 | Roeser et al. | |
| 2003/0089037 A1 | 5/2003 | Ware | |
| 2003/0224507 A1 | 12/2003 | Darlington | |
| 2005/0039397 A1 | 2/2005 | Roy | |
| 2005/0055879 A1 | 3/2005 | Darlington | |
| 2006/0156624 A1 | 7/2006 | Roy | |
| 2006/0283082 A1 | 12/2006 | Stevenson | |
| 2007/0033866 A1 | 2/2007 | Henry | |
| 2007/0266908 A1 | 11/2007 | Monteith et al. | |
| 2008/0120904 A1 | 5/2008 | Takahashi | |
| 2010/0146855 A1 | 6/2010 | Ma | |
| 2012/0281413 A1 | 11/2012 | Lewis | |
| 2012/0291349 A1 | 11/2012 | Teng | |
| 2012/0297678 A1 | 11/2012 | Luebbers et al. | |
| 2012/0297679 A1 | 11/2012 | Busch | |
| 2012/0298599 A1 | 11/2012 | Sichello | |
| 2012/0311929 A1 | 12/2012 | Daas | |
| 2013/0118074 A1 | 5/2013 | Fulbrook | |
| 2013/0160363 A1 | 6/2013 | Whitney | |
| 2013/0212940 A1 | 8/2013 | Blyden | |
| 2013/0213841 A1 | 8/2013 | Ward | |
| 2014/0000163 A1 | 1/2014 | Lin | |
| 2014/0083008 A1 | 3/2014 | Kotsatos | |
| 2014/0109473 A1 | 4/2014 | Sung | |
| 2014/0137472 A1 | 5/2014 | Anderson et al. | |
| 2014/0283450 A1 | 9/2014 | Darlington | |
| 2015/0040477 A1 | 2/2015 | Wang | |
| 2015/0077984 A1 | 3/2015 | Smith | |
| 2015/0116997 A1 | 4/2015 | Fappert | |
| 2015/0223402 A1 | 8/2015 | Krijn | |
| 2015/0237811 A1 | 8/2015 | Marquez | |
| 2015/0264859 A1 | 9/2015 | Morrissey | |
| 2015/0289452 A1 | 10/2015 | Axley | |
| 2015/0305108 A1 | 10/2015 | Probasco | |
| 2015/0334930 A1 | 11/2015 | Stoltzfus | |
| 2016/0029581 A1 | 2/2016 | Martin | |
| 2016/0157447 A1 | 6/2016 | Hanzawa | |
| 2016/0366838 A1 | 12/2016 | Hanzawa | |
| 2017/0055460 A1 | 3/2017 | Brusatore | |
| 2017/0055538 A1 | 3/2017 | Ohta | |
| 2017/0094920 A1 | 4/2017 | Ellins | |
| 2017/0099792 A1 | 4/2017 | Gallant | |
| 2017/0105372 A1 | 4/2017 | Bryan, III | |
| 2017/0142912 A1 | 5/2017 | Gasmer | |
| 2017/0258021 A1 | 9/2017 | Chiu | |
| 2017/0265408 A1 | 9/2017 | McGowan | |
| 2017/0299148 A1 | 10/2017 | Xie | |
| 2017/0339841 A1 | 11/2017 | Monasterio | |
| 2017/0339842 A1 * | 11/2017 | Weisel | F24F 5/0003 |
| 2017/0339854 A1 | 11/2017 | van der Merwe | |
| 2018/0000029 A1 | 1/2018 | Martin et al. | |
| 2018/0007838 A1 | 1/2018 | McCord | |
| 2018/0007845 A1 | 1/2018 | Martin | |
| 2018/0014486 A1 | 1/2018 | Creechley | |
| 2018/0035619 A1 | 2/2018 | Ueno | |
| 2018/0064037 A1 | 3/2018 | Tyink | |
| 2018/0084738 A1 | 3/2018 | Kuo | |
| 2018/0110188 A1 | 4/2018 | Zhou | |
| 2018/0168108 A1 | 6/2018 | Foreman | |
| 2018/0199526 A1 | 7/2018 | Guo | |
| 2018/0206414 A1 | 7/2018 | Goodman | |
| 2018/0235155 A1 | 8/2018 | Funamor | |
| 2018/0242539 A1 * | 8/2018 | Bhattacharya | A01G 9/24 |
| 2018/0255709 A1 * | 9/2018 | Topps | A01G 9/249 |
| 2018/0263201 A1 * | 9/2018 | Linneberg | A01G 9/022 |
| 2019/0159415 A1 | 5/2019 | Bertram et al. | |
| 2021/0212276 A1 * | 7/2021 | Hersh | A01G 31/06 |

FOREIGN PATENT DOCUMENTS

| | | |
|---|---|---|
| CN | 204837399 U | 12/2015 |
| CN | 205143093 U | 4/2016 |
| DE | 202012011315 | 2/2013 |
| DE | 202012011393 | 3/2013 |
| EP | 1779720 | 5/2007 |
| EP | 3251499 | 12/2017 |
| FR | 2968891 | 6/2012 |
| FR | 3061259 | 6/2018 |
| JP | 2012228231 | 11/2012 |
| JP | 5492758 | 5/2014 |
| JP | 5495198 | 5/2014 |
| JP | 5535390 B1 | 7/2014 |
| JP | 2015000002 | 1/2015 |
| WO | 2006003645 | 1/2006 |
| WO | 2015108053 | 7/2015 |
| WO | 2016053781 | 4/2016 |
| WO | 2016072042 | 5/2016 |
| WO | 2016081711 | 5/2016 |
| WO | 2017118814 | 7/2017 |
| WO | 2018035314 | 2/2018 |
| WO | 2019006019 A1 | 1/2019 |

* cited by examiner

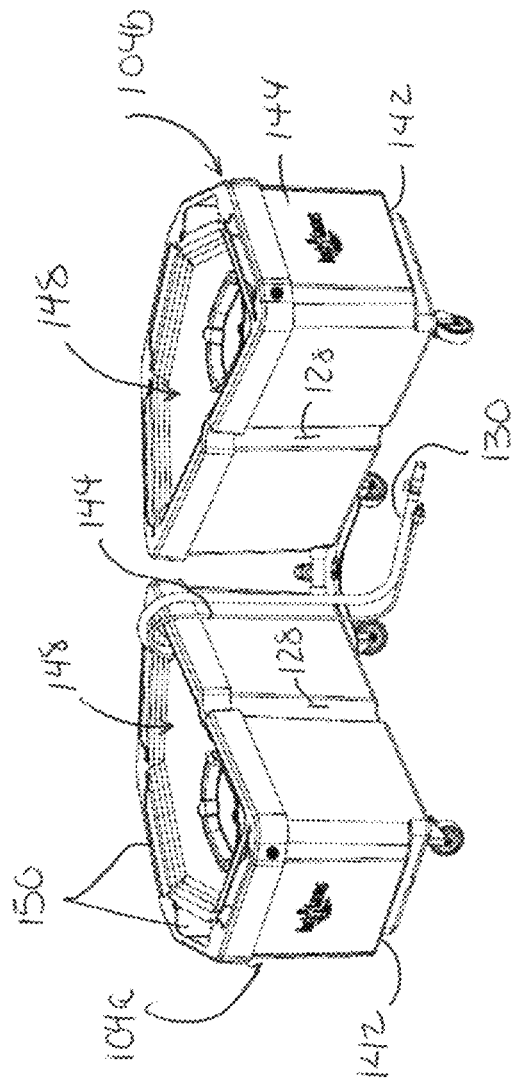
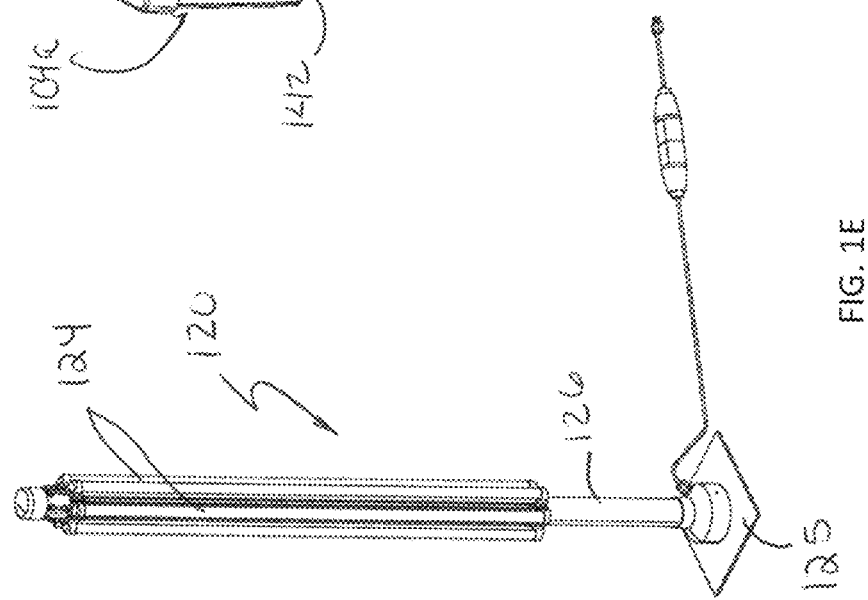

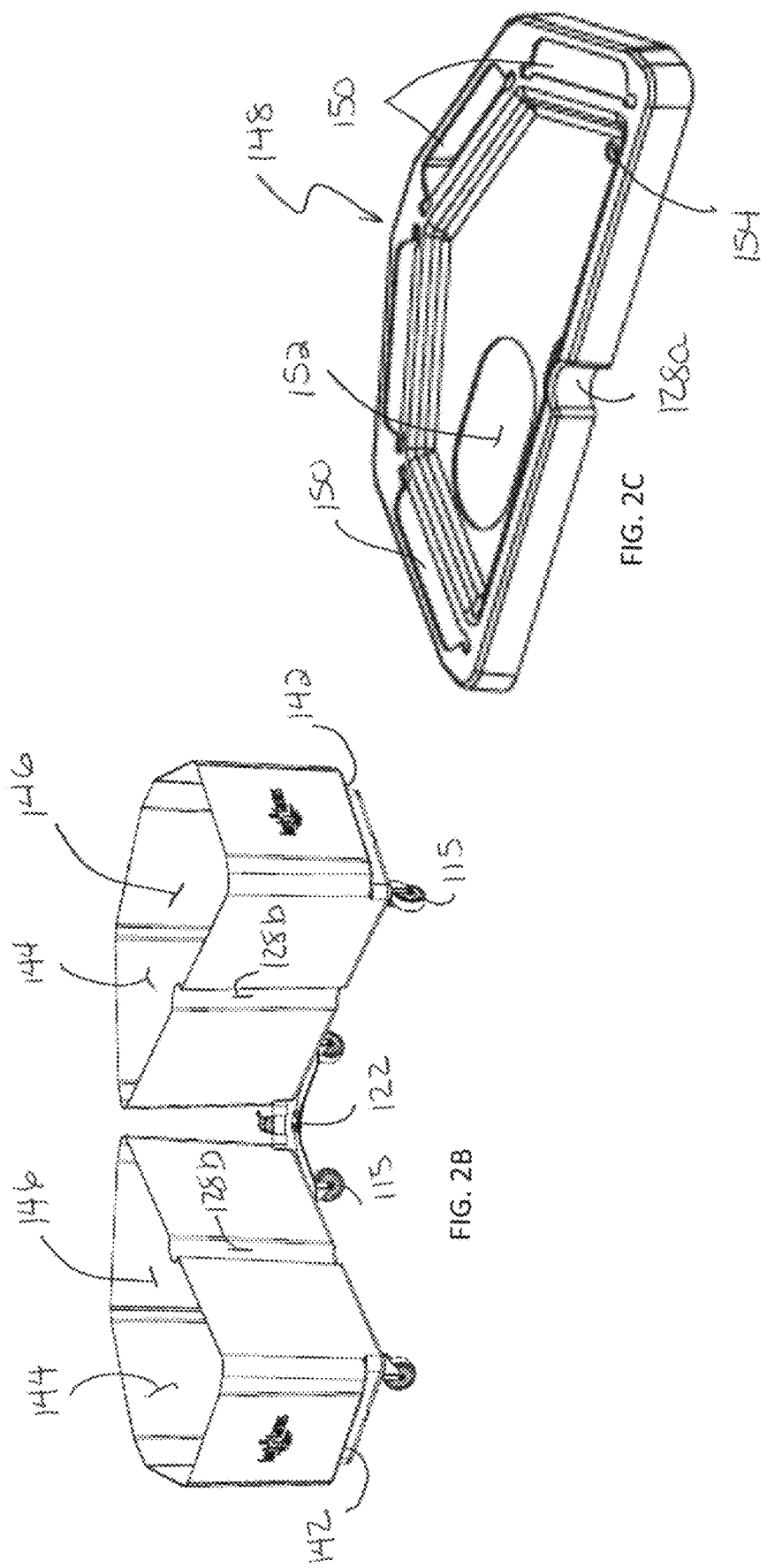

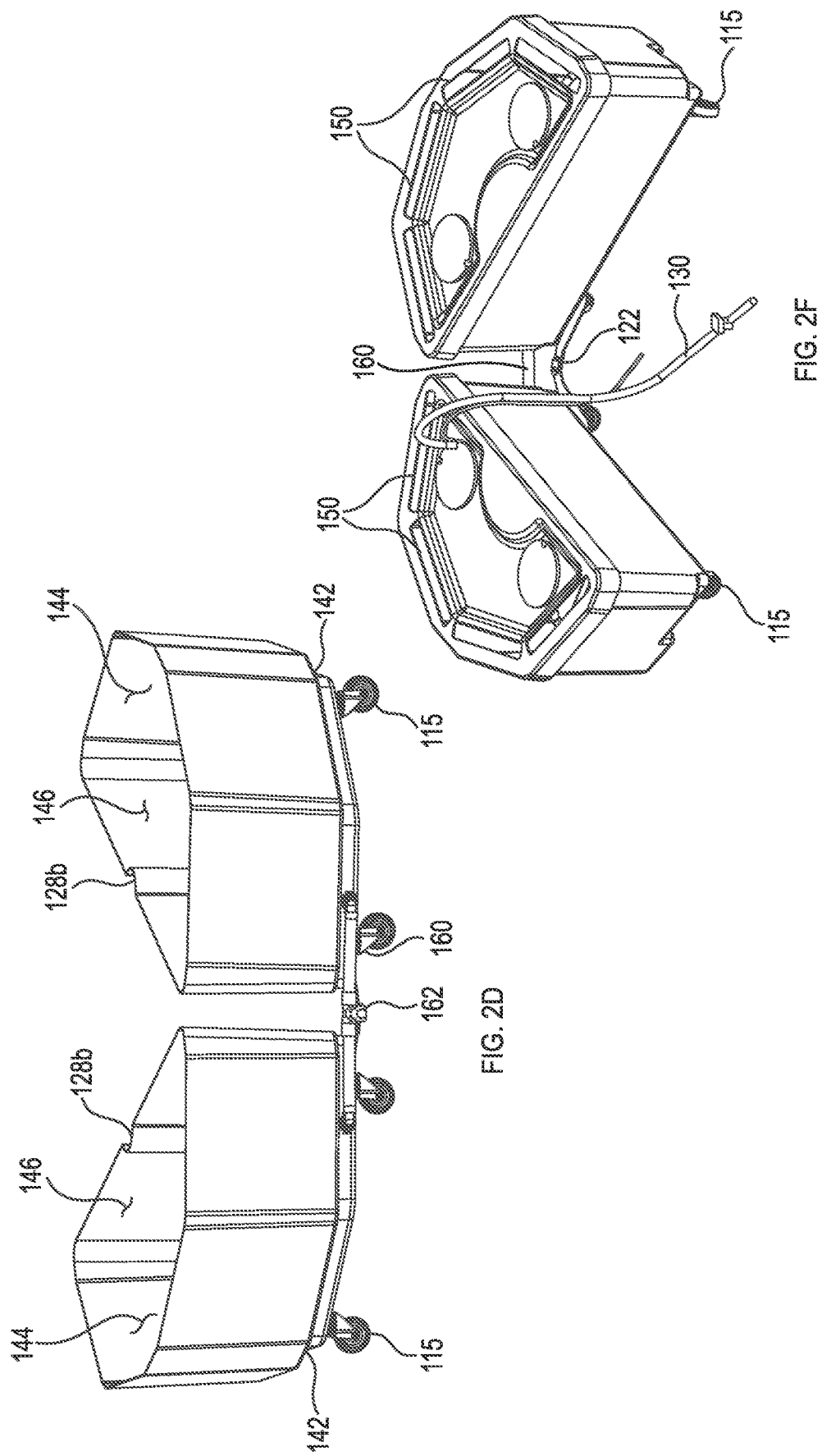

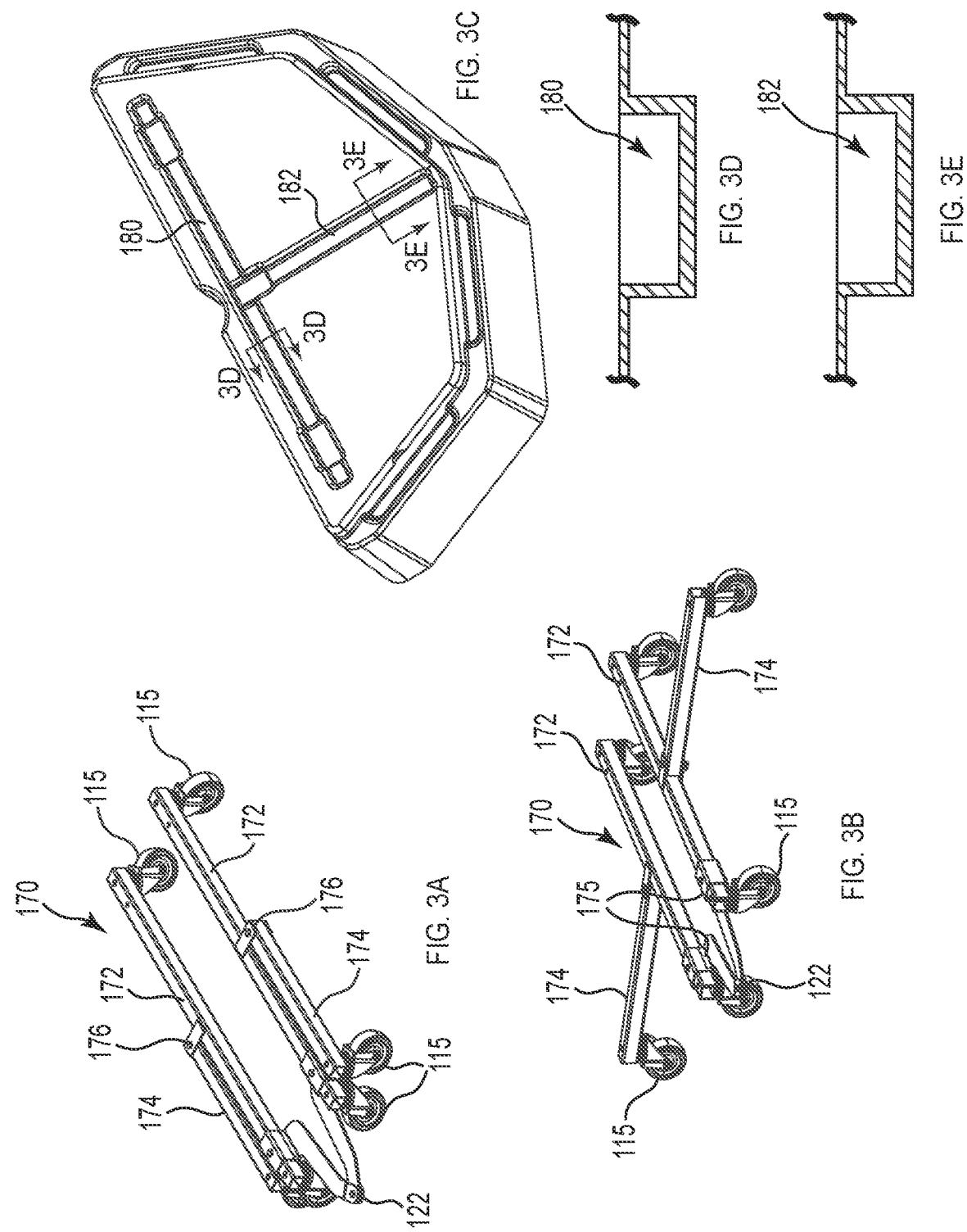

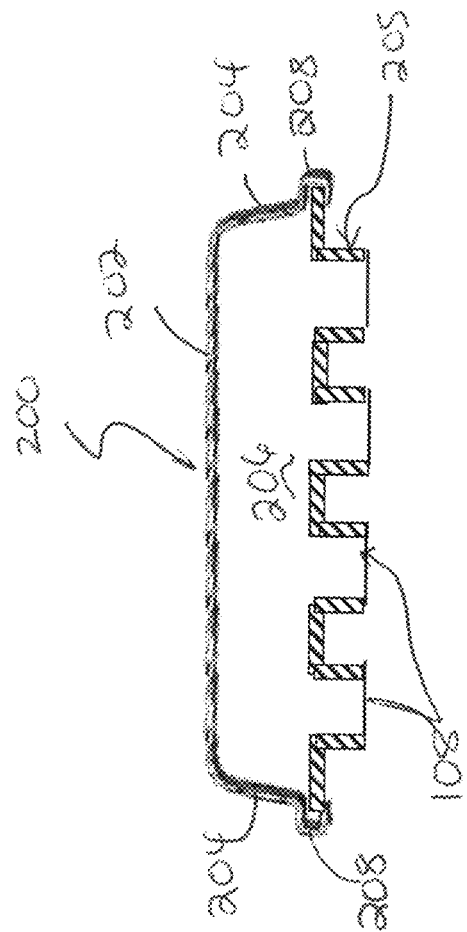
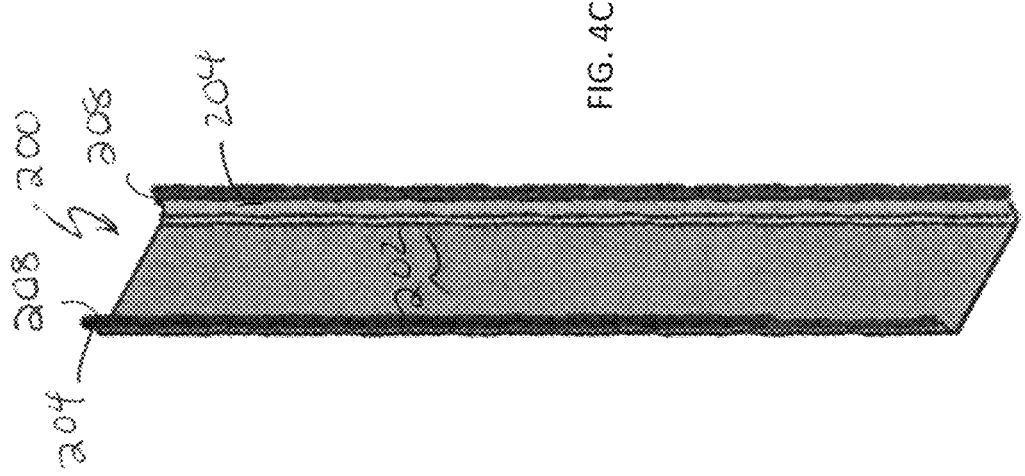

HYDROPONIC GROW ASSEMBLY

CROSS REFERENCE TO RELATED APPLICATIONS

The present application claims priority to U.S. Provisional application Ser. No. 62/942,571 filed Dec. 2, 2019 and entitled HYDROPONIC GROW ASSEMLY, the content of which is hereby incorporated by reference into the present application.

BACKGROUND

Hydroponic gardening or farming is becoming more popular. Hydroponics can be used to extend the growing season. The increased popularity of hydroponics has increased demand for flexible hydroponic growth assemblies that are easy to use and maintain. The present application addresses these and other issues or objectives.

SUMMARY

The present application relates to a hydroponic grow assembly including a base and at least one plant structure removably connectable to the base to form a plant wall for growing plants. The plant structure includes a plurality of plant wells opened to a root chamber and the base includes a bottom structure enclosed by a perimeter wall to form an inner cavity of a reservoir tank to supply water to the root chamber of the plant structure. The bottom structure of the base includes a support feature within the inner cavity of the reservoir tank to support the at least one plant structure in an upright position to form the plant wall.

In illustrated embodiments, the support feature is a raised support block formed on the bottom structure having a length and width sized to insert into an opened bottom end of the plant structure so that the plant structure fits over the raised support block to connect the plant structure to the base in the upright position. As shown, in illustrative embodiments the plant structure is formed of a U-shaped frame having an opened front side and at least one plant panel coupled to the opened front side to form the enclosed root chamber. The at least one plant panel includes a plurality of plant wells opened to the root chamber. In illustrative embodiments, the plant structure includes a plurality of plant panels slideably connected to the U-shaped frame through tongue and groove features to enclose the root chamber. As described, water flow is provided to the root chamber through an input at a top of the plant structure and is discharged through an opening at a bottom of the plant structure.

For use, in illustrative embodiments, the plant structure is inserted into the reservoir tank to engage the support feature to retain the plant structure in the upright position to form the plant wall. As described, in illustrative embodiments, the plant structure is formed of the U-shaped frame and at least one plant panel coupled to the U-shaped frame to form the plant structure. The U-shaped frame is inserted through a cover opening into the reservoir tank to engage the support feature and one or more plant panels are slideably connected to the U-shaped frame to form the enclosure for the root chamber. In particular, the U-shaped frame is fitted over a raised support block to retain the plant structure in the upright position.

The present application also discloses a hydroponic growth assembly include a clam shell structure formed of a plurality of base structures or reservoir tanks moveable between an opened position and a closed position. Plant structures are connected to the base structures to form the plant wall. In particular, the plant structures are connected to an outer perimeter of the base structure to form a perimeter grow wall enclosing a light fixture. In the illustrative embodiments, the base structures are pivotally connected to form a clam shell structure and multiple plant structures are connected to the bases to form the grow wall. The present application includes these and other features as described and shown in illustrative embodiments herein.

BRIEF DESCRIPTION OF DRAWINGS

FIG. 1E illustrates an embodiment of the light fixture for the grow assembly shown in FIGS. 1A-1D.

FIG. 2A illustrates an embodiment of base structures pivotally connected to form a clam shell construction having an opened position and closed position for a grow assembly of the present application.

FIG. 2B illustrates an embodiment of reservoir tanks of base structures of the clam shell assembly shown in FIG. 2A.

FIG. 2C illustrates an embodiment of a cover configured to close the reservoir tanks of the base structures.

FIG. 2D illustrates a back side of the reservoir tanks of FIG. 2B.

FIG. 2F illustrates another embodiment of the base structures for a hydroponic grow assembly of the present application.

FIGS. 3A-3B illustrate an embodiment of a caster assembly for the base structures shown in a collapsed position in FIG. 3A and an expanded position in FIG. 3B.

FIG. 3C is a bottom view of the reservoir tank illustrating recessed tracks to interface with rails of the caster assembly shown in FIGS. 3A-3B.

FIG. 3D is a cross-sectional view as generally taken along line 3D-3D of FIG. 3C.

FIG. 3E is a cross-sectional view as generally taken along line 3E-3E of FIG. 3C.

FIG. 4C illustrates a U-shaped frame of a plant structure of the present application.

FIG. 4D is a cross-sectional view of the plant structure formed of the U-shaped frame of the present application.

FIG. 8E illustrates another embodiment of a plant structure of the present application.

DETAILED DESCRIPTION OF ILLUSTRATIVE EMBODIMENTS

Figure 1A:
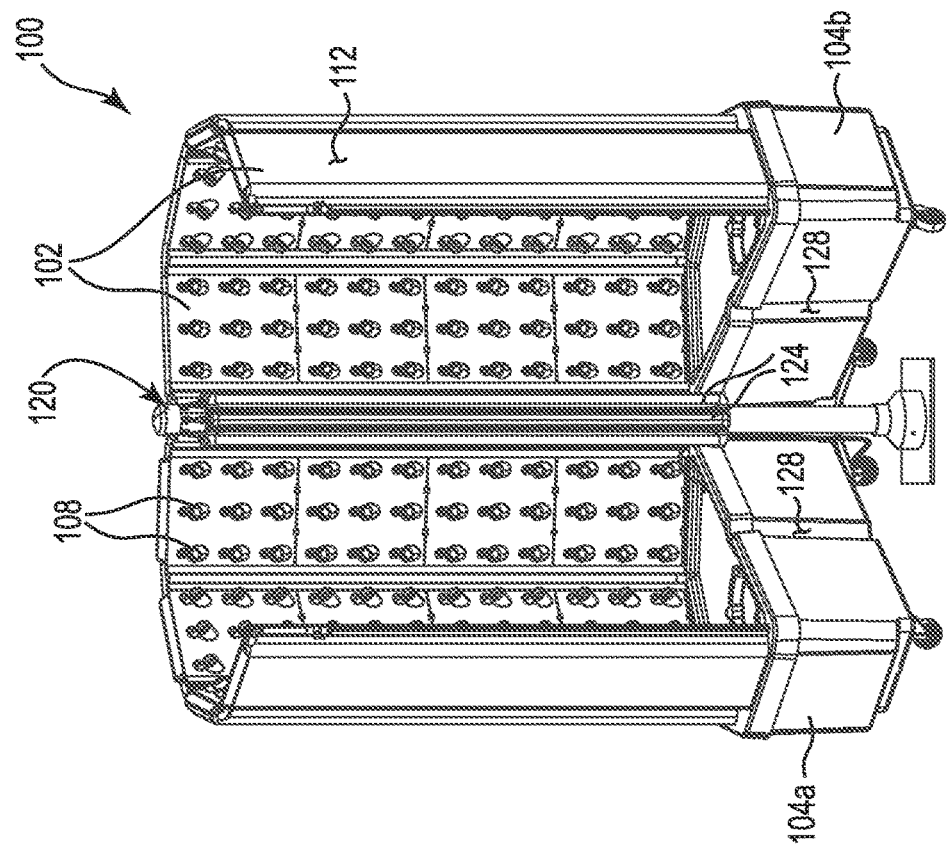
FIG. 1A is a perspective illustration of an embodiment of a hydroponic grow assembly shown in an opened position.
Figure 1B:
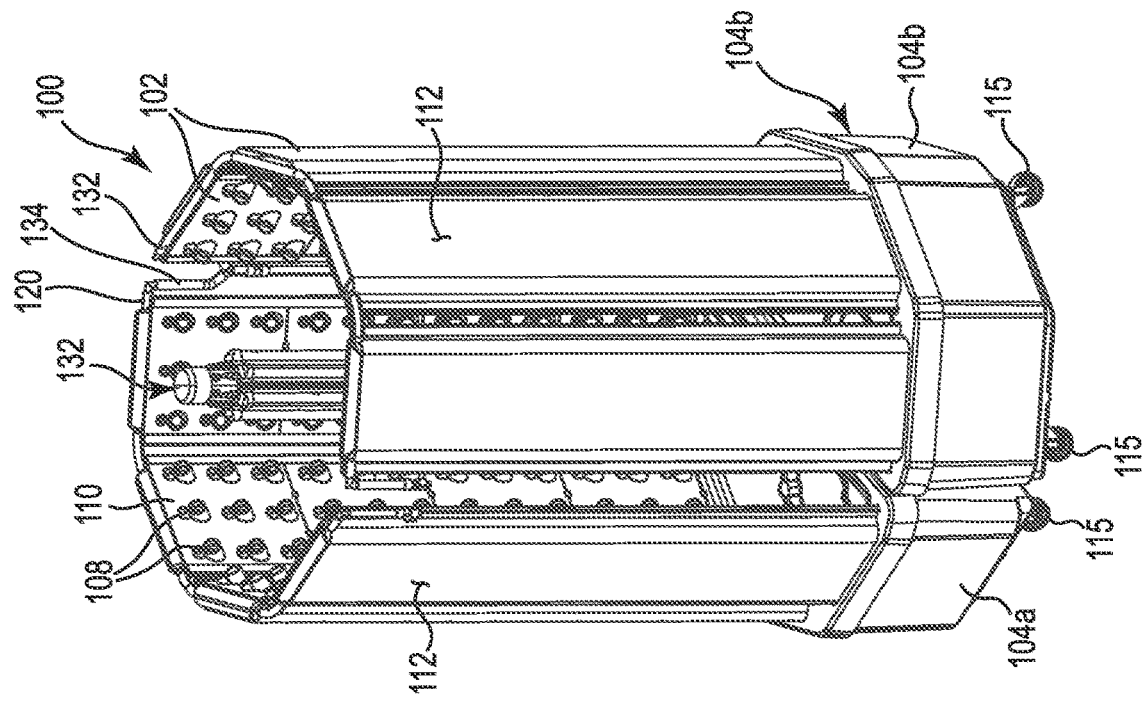
FIG. 1B is a perspective illustration of an embodiment of a hydroponic grow assembly shown in a closed position.
Figure 1D:
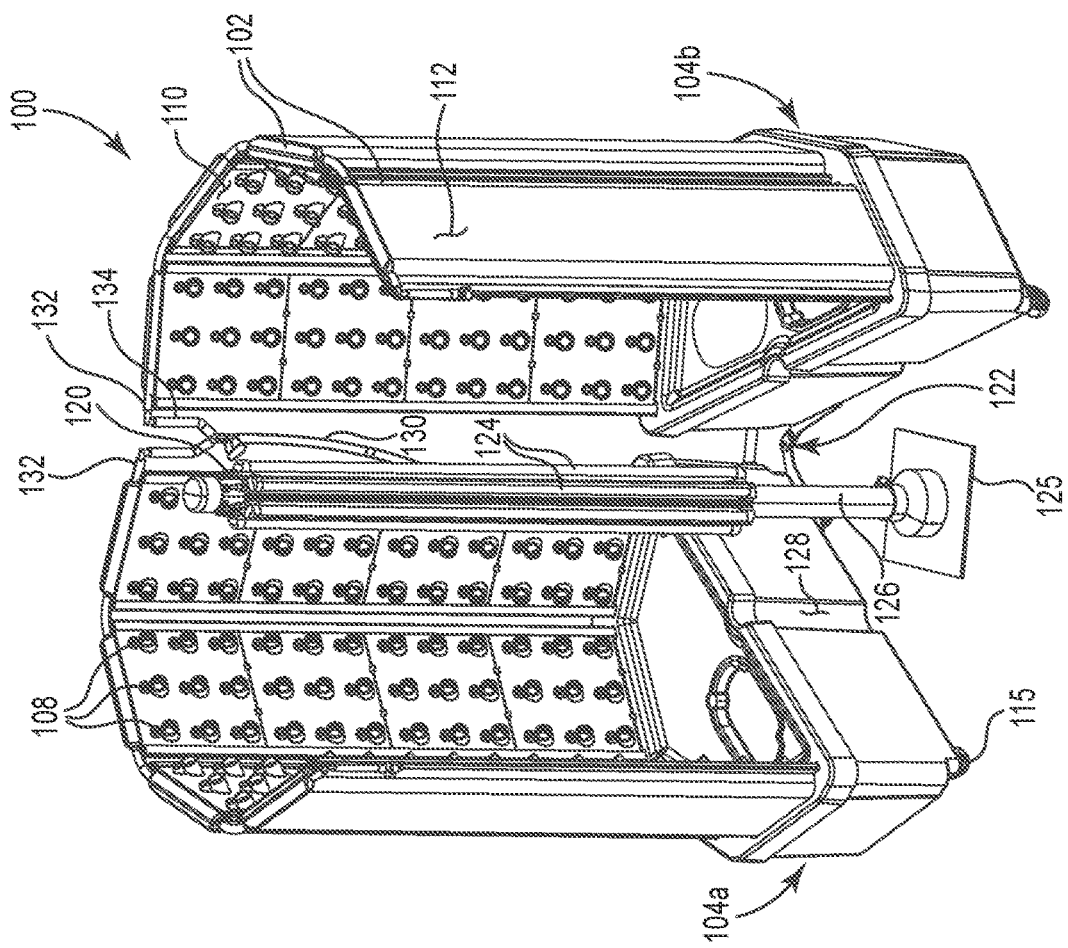
FIG. 1D is a perspective illustration of an embodiment of the hydroponic assembly shown in FIGS. 1A-1B with a light fixture shown in the opened position.
Figure 1C:
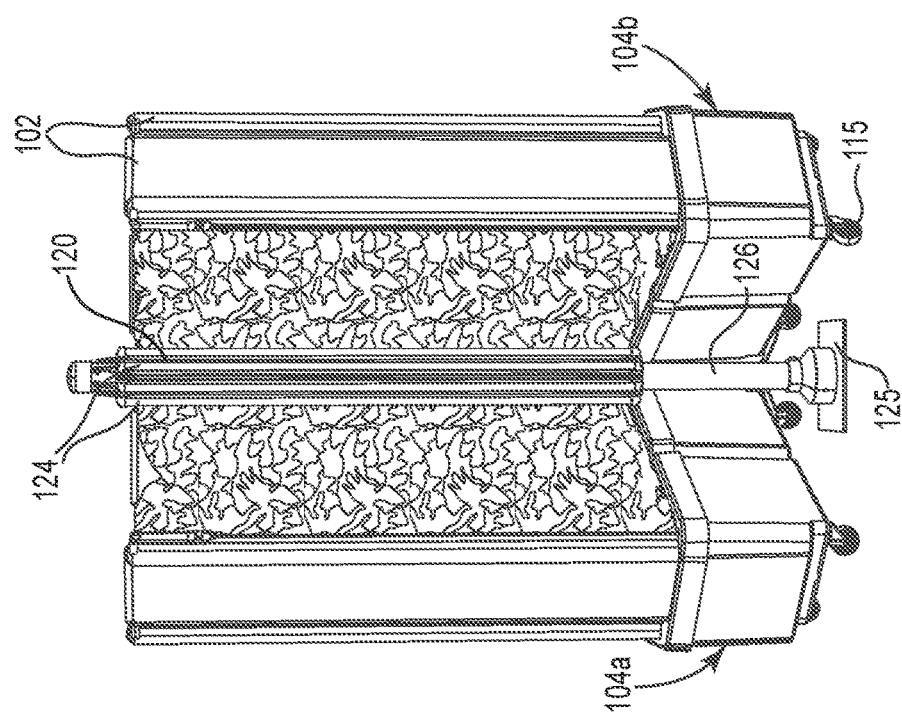
FIG. 1C is another perspective illustration of an embodiment of the hydroponic grow assembly shown in FIGS. 1A-1B having plants growing on a plant wall of the assembly.

The present application relates to a hydroponic grow assembly 100, an embodiment of which is shown in FIGS. 1A-1D. As shown, in FIGS. 1A-1D, the assembly 100 includes a plurality of plant structures 102 coupled to base structures 104a and 104b to form a plant wall having a plurality of plant wells 108 for growing plants. The plurality of plant structures 102 include a front side 110 and a back side 112 spaced outwardly from the front side 110 to form inner and outer surfaces of the grow assembly 100. The front sides 110 of the plurality of plant structures 102 include the plant wells 108 to form the plant wall for growing plants as shown in FIG. 1C. As shown, a plurality of caster or roller wheels 115 are operably coupled to base structures 104a, 104b to move the base structures 104a, 104b between an opened position shown in FIG. 1A for planting and maintenance and a closed position as shown in FIG. 1B for growing plants. As shown in FIG. 1B, in the closed position, the plant wall surrounds light fixture 120 which supplies light to the growing plants.

As shown in FIG. 1D, the base structures 104a, 104b are connected through hinge 122 to form a clam shell structure movable between the opened position and the closed position and the plant structures 102 are connected to the base structures 104a, 104b to form the perimeter plant wall generally surrounding the light fixture 120. As shown in FIG. 1E, the light fixture 120 includes a plurality of lighting elements 124 to provide 360 degree lighting to the perimeter plant wall surrounding the light fixture 120. As shown in detail in FIG. 1E, the light fixture 120 includes a base 125, and an upright post 126. The plurality of lighting elements 124 are spaced about the upright post 126 for 360 degree lighting. Illustrative lighting elements 124 include incandescent bulbs, LED (light emitting diodes), metal halide, fluorescent bulbs, high pressure sodium vapor light elements as well as other lighting elements. Various control elements including a digital timer, temperature and humidity sensors, pump analytics and water level sensing devices can be incorporated into the light fixture 120. As shown, each of the base portions 104a, 104b include a donut hole 128 to accommodate the light fixture 120 when the base portions 104a, 104b of the clam shell structure are closed for use and plant growth.

Figure 2E:
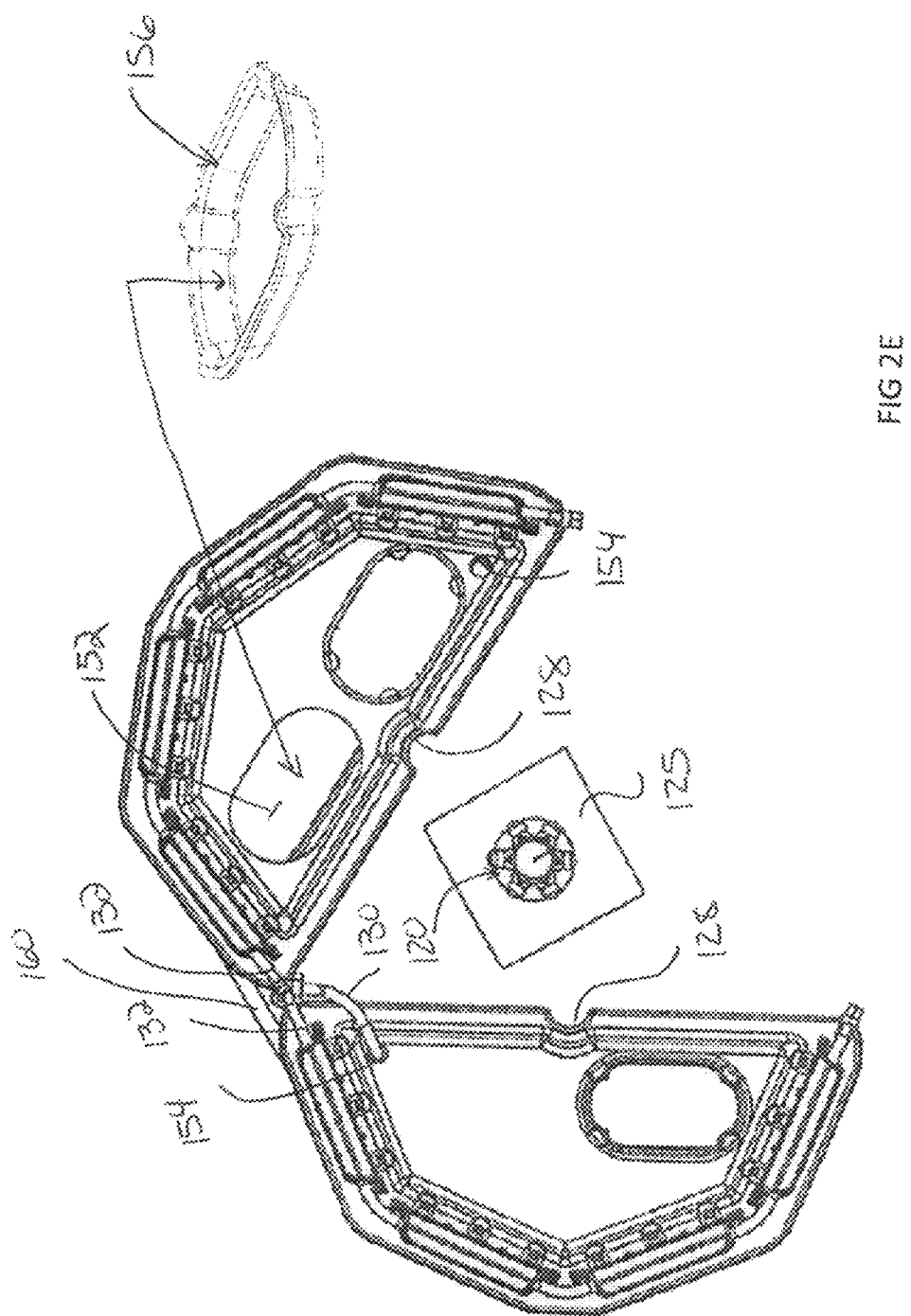
FIG. 2E is a top view of the base structures of the present application shown in the opened position with an access cover exploded.

Water is supplied to the plurality of plant structures 102 via an irrigation line 130 as visible in FIG. 1D connected to drip lines 132 through a branch connection 134. FIGS. 2A-2E illustrate an embodiment of base structures 104a, 104b which as shown include a bottom structure 142 and perimeter wall 144 enclosing a tank cavity 146 forming the reservoir tanks of the base structures 104a, 104b. The tank cavity 146 is closed by cover 148 which fits over the perimeter wall 144 of the reservoir tank as shown in FIGS. 2A-2C. In the embodiment shown, the cover 148 includes plant structure openings 150 spaced about an outer perimeter of the base structure 104a, 104b or reservoir tank for removably connecting the plant structures 102 to the base structures 104a, 104b.

In the embodiment shown, the cover 148 includes four plant structure openings 150 for connection of four plant structures 102, however, application is not limited to a particular number of plant structures 102. The cover 148 also includes a plurality of access openings for access to the inner tank cavity 146 (FIG. 2B) of reservoir tanks. In the illustrated embodiment the access openings include an oval shaped opening 152 to accommodate a pump or other device as shown in FIGS. 2A and 2C. The reservoir tanks can be filled with water through access openings or when the cover 148 is removed. The cover also includes an opening 154 for the irrigation line 130 and power cord to operate the pump (not shown).

The oval shaped access openings 152 are closed via port covers 156 to seal the reservoir tanks for use as shown in FIG. 2E. In the embodiment shown, both the cover and reservoir tank include a concave indent 128a, 128b to form the donut hole 128 to accommodate the light fixture. As shown in FIG. 2B, the reservoir tanks of the base structures 104a, 104b are fluidly connected via hose 160 to equalize the fluid in each reservoir tank as shown in FIGS. 2D-2F. In particular, hose 160 is connected to the inner tank cavity 144 of base structures 104a, 104b using a fluid tight seal to allow water flow between tanks. Water flow between tanks is controlled via valve 162 along hose 160. Use of the hose 160 allows for the use of one pump to pump water from both tanks through the irrigation line 130 via gravity feed. In alternate embodiment, water is pumped from each reservoir tank to the drip lines 132 through separate pumps in the separate reservoir tanks. While FIG. 2A shows oval access openings 150 for a pump or other device application not limited to a particular shape and the cover 148 can include different shaped access openings as shown in FIG. 2F.

As previously described, the base structures 104a, 104b include caster wheels 115 to move the base structures 104a, 104b between the opened and closed positions. In an illustrated embodiment, the caster wheels 115 are coupled to the base structures 104, 104b through a caster assembly 170. As shown, the caster assembly 170 includes a plurality of lengthwise rails 172 and crosswise rails 174. Caster wheels 115 are coupled to opposed ends of the lengthwise rails 172 and coupled to an extended end of crosswise rails 174. As shown, lengthwise rails 172 are pivotally connected via the hinge connection 122 coupled to the lengthwise rails 172 via brackets 175.

The crosswise rails 174 are connected to the lengthwise rails 170 via a hinge connection 176 proximate to a mid-length of the lengthwise rails 170 to provide a lateral or cross support for the reservoir tanks. As comparatively shown in FIGS. 3A and 3B, the crosswise rails 174 pivot about the hinge connection 176 to collapse the caster assembly 170 for transport. As shown in FIGS. 3C-3E, the base structures include lengthwise and crosswise tracks 180, 182 along the bottom structure 142 of the reservoir tanks sized for placement of the lengthwise and crosswise rails 170, 172 to support the reservoir tanks on the caster assembly 170 to open and close the base structures 104a, 104b of the clam shell assembly for use as comparatively shown in FIGS. 1A-1B. As shown in FIGS. 3A and 4A, the rails 172, 174 are formed of a hollow square beam structure to support the caster wheels 115 of the caster assembly 170. The reservoir of the assembly of the present application includes the plurality of plant structure support features along the bottom structure 142 of the reservoir tank as shown in FIG. 4A.

Figure 4B:
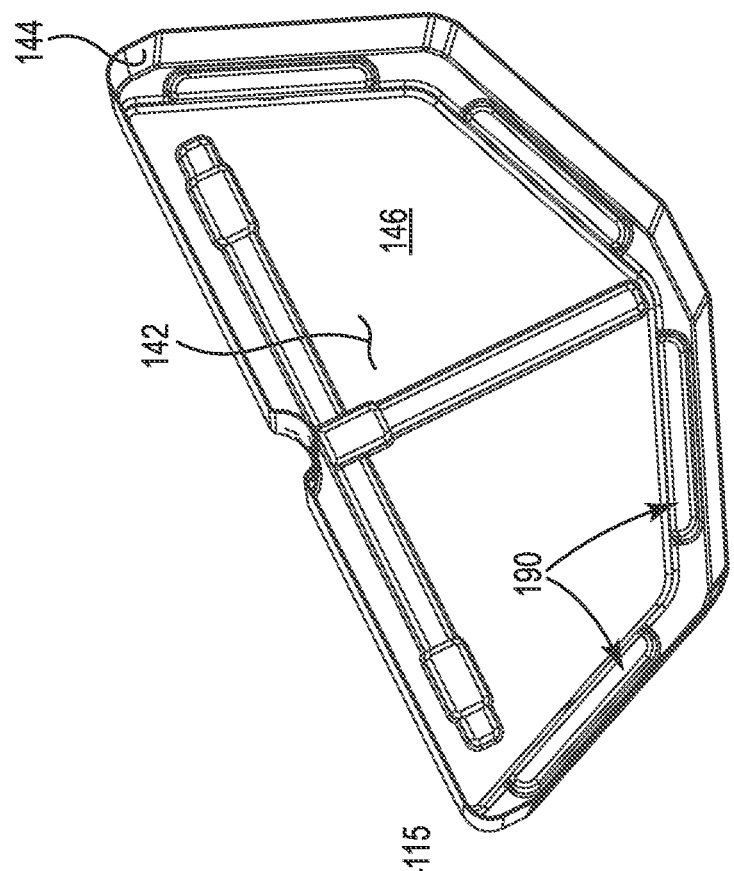
FIG. 4B is a top view of the reservoir tank illustrating the inner tank cavity and support feature.
Figure 4A:
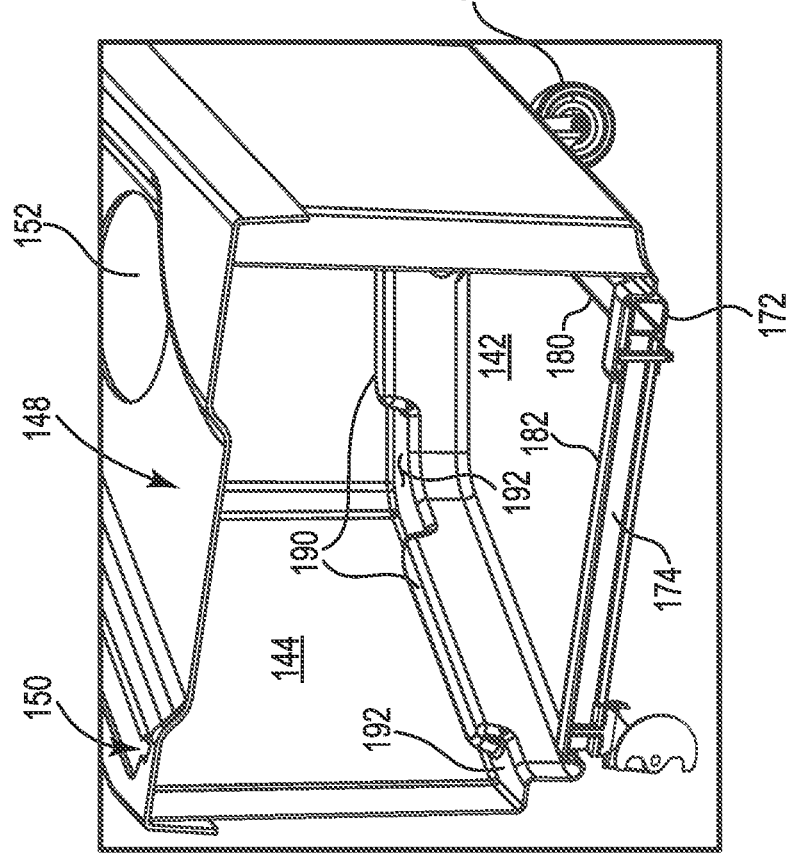
FIG. 4A is a cut-away perspective illustration of the base structure illustrating a bottom structure of the reservoir tank.

In the embodiment shown in FIGS. 4A-4B, the support features on the bottom structure 142 include a plurality of raised support blocks 190 spaced about a perimeter of the tank cavity to support the plant structures 102 extending through openings 150 on the cover 148 to form the grow wall. As shown, the bottom structure 142 includes a raised ledge 192 and the blocks 190 are formed thereon In the illustrated embodiments shown in FIGS. 3C, 4A, 4B, lengthwise and crosswise tracks 180, 182 and raised support blocks 190 are blow molded features on the bottom structure 146 of the reservoir tanks.

In an illustrative embodiment shown in FIGS. 4C-4D, the plant structures 102 are formed of a U-shaped frame 200 having back and side walls 202, 204 and front plant panel 205 including the plant wells 108. As shown in FIG. 4D, the plant panels 205 are removably coupled to the U-shaped frame 200 to form the enclosed root chamber 206. The plant panel 205 is connected to the U-shaped frame 200 through a tongue and groove connection. The plant wells 108 are formed on the plant panel 205 and have a well channel opened to the root chamber 206. Water from the drip line 132 flows through the root chambers 206 to provide water flow to plant roots for plant growth. In the illustrated embodiment, the groove features are provided by elongate grooves 208 formed along sides 204 of the U-shaped frame 200 and the tongue feature is formed via sides of the panel 205. In the illustrated embodiment, the height of the U-shaped frame 200 is sized to accommodate a plurality of plant panels 205 for the plant wall.

Figure 4F:
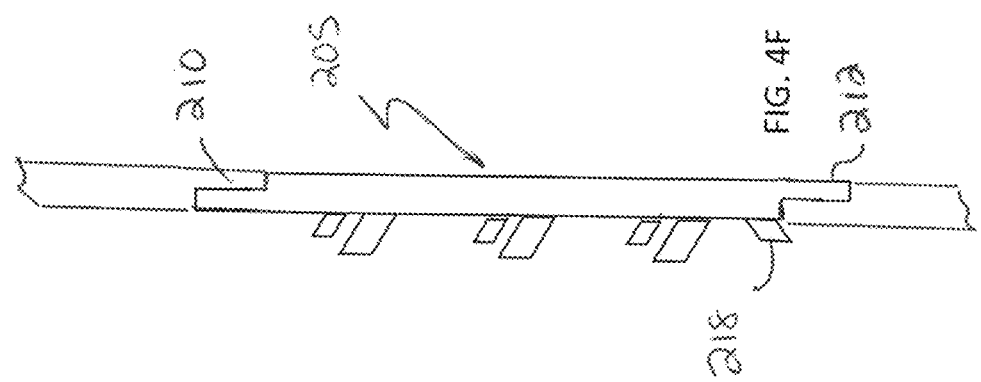
FIG. 4F is a side view of the plant panel show in FIG. 4E.
Figure 4E:
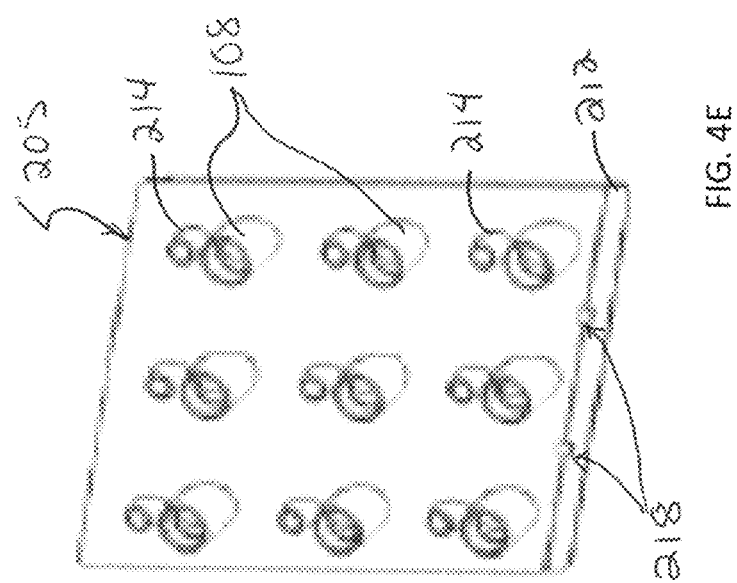
FIG. 4E illustrates an embodiment of a plant panel for the plant structure of FIG. 4D.

As shown in FIG. 4E-4F, the panels 205 include stepped top and bottom edges 210, 212 to provide a fluid tight interface for multiple stack panels 205 connected to the U-shaped frames 200. The plant panels 205 include the plant wells 108 opened to the root chamber 206 and trellis feature 214. The plant wells 108 are sized to accommodate planting or custom clone collars. The plant panels also include a contact feature 218 that extends from a front surface of the panel 205 to retain alignment of the panels 205. The features and plant structure can be formed of a molded plastic material and application is not limited to a particular fabrication process, method or construction. As described, the U-shaped frame 200 and plant panels 205 described provide a flexible modular design which can be stacked for shipping and storage.

Figure 5B:
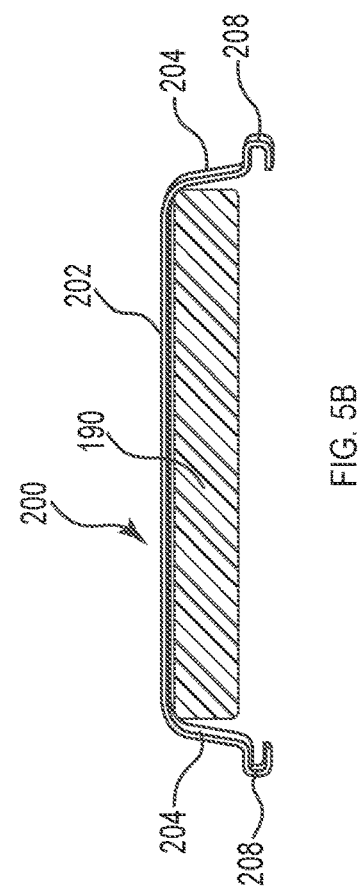
FIG. 5B illustrates the plant structure fitted over the support block of FIG. 5A.
Figure 5A:
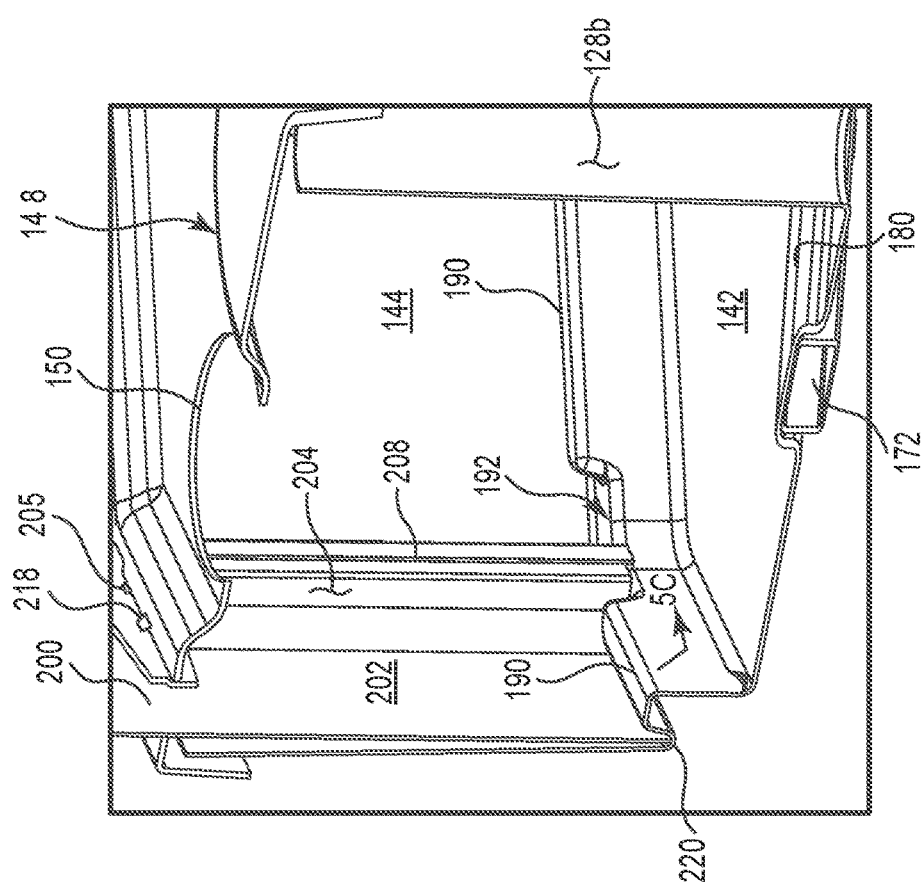
FIG. 5A is a cut-away perspective illustration of a reservoir tank showing a U-shaped frame of a plant structure supported on a raised support block or support feature on the bottom structure of the reservoir tank.
Figure 5D:
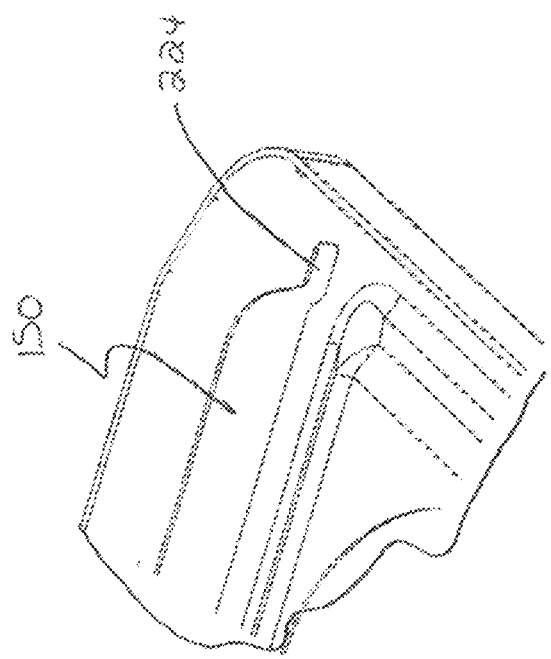
FIG. 5D is a detailed view of a portion of an opening in the cover of the reservoir tanks for the plant structures.
Figure 5C:
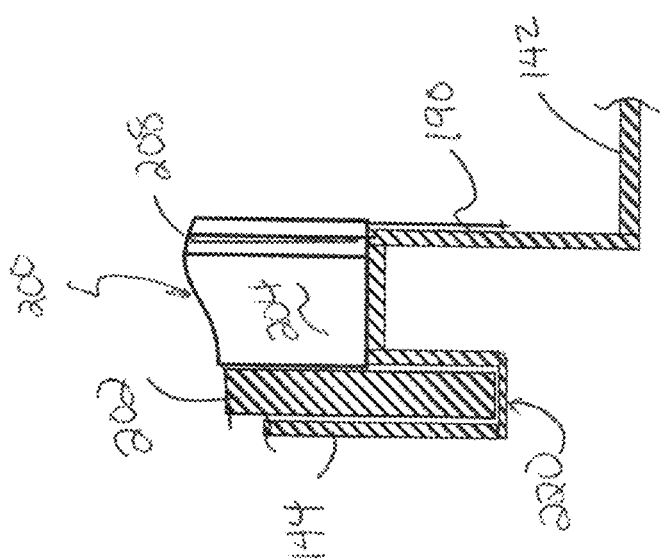
FIG. 5C is a cross-sectional view as taken generally along line 5C of FIG. 5A.
Figure 8D:
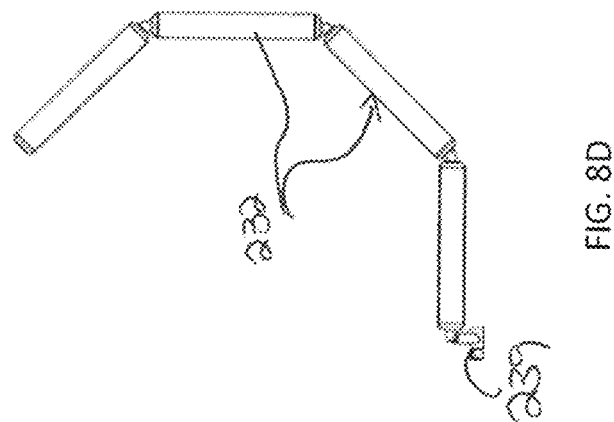
FIG. 8D illustrates an embodiment of a drip line assembly for supplying water to root chambers of the plant structures shown in FIG. 8C.

As shown in FIG. 5A, the U-shaped frame 200 extends through the plant structure openings 150 on the cover 148 and are supported relative to the raised support block 190 or support feature as described. In particular, as shown in FIG. 5A, the support feature includes support blocks 190 formed on a perimeter ledge 192 of the bottom structure 142. The blocks 190 have a length and width sized so that an opened bottom end of the U-shaped frame 200 fits over the support block 190 to connect the plant structures 102 to the base structures 104a, 104b or reservoir tank. As shown in FIG. 8A, the support block 190 is spaced from the perimeter 144 of the base structure 104a, 104b to form a slot 220 for the back side or wall 202 of the U-shaped frame 200. For use the U-shaped frame 200 is supported on the support block 190 and the contact feature 218 of the bottom plant panel 205 abuts cover 148 to retain the plant panel 205 above the reservoir tank. Water from the root chamber 206 is discharged from the bottom of the plant structure 102 into the reservoir tank and is recycled. In particular, as shown in FIG. 5A, a length of the U-shaped frame 200 of the plant structures 102 extends below the cover 148 and is supported on block 190. Support blocks 190 are sized and dimensioned to abut the back and side walls 202, 204 of the U-shaped frame 200 to retain and limit movement of the plant structure as shown in FIG. 5B-5C. As shown in detail in FIG. 5D the plant structure openings 150 through cover include notched side portions 224 to accommodate the shape of the side walls of U-shaped frames and opposes grooves 208 formed therealong.

Figure 6B:
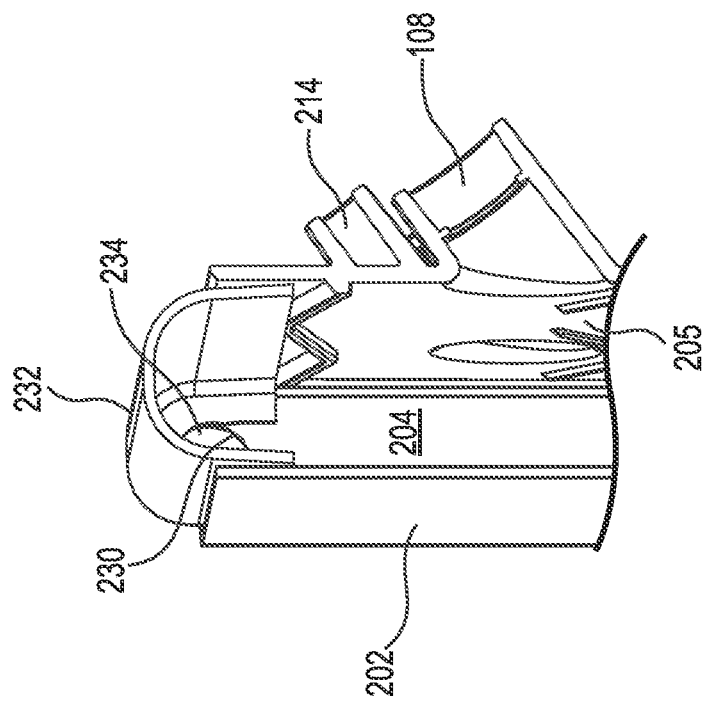
FIG. 6B is a perspective illustration of the plant structure shown in FIG. 6A with the top cap attached.
Figure 6A:
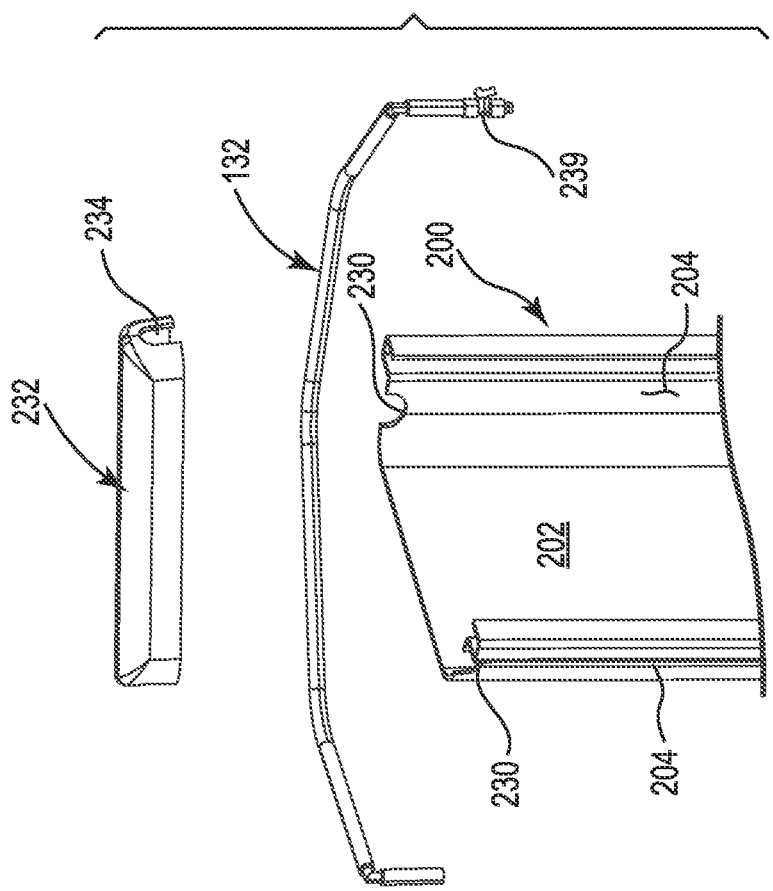
FIG. 6A is an exploded view illustrating a top portion of the frame, drip line and top cap of an illustrated embodiment of the plant structures and assembly of the present application.
Figure 6C:
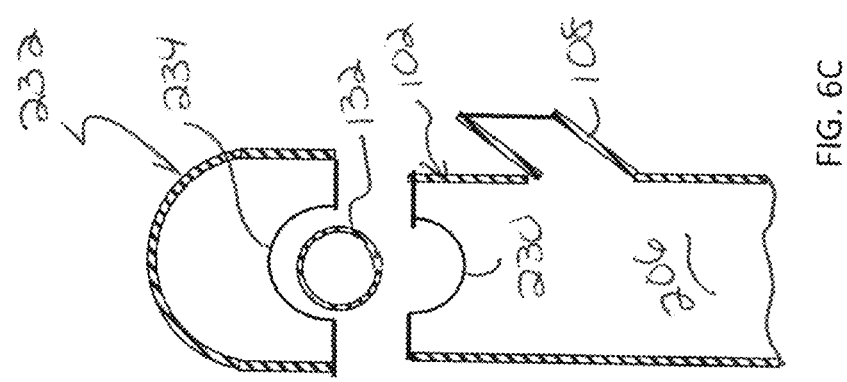
FIG. 6C is a cross-sectional view of an embodiment of the plant structure shown with the top cap and drip line exploded.

As previously described, water is supplied to the top of the root chamber 206 through irrigation line 130 and drip lines 132. Water flows from the top of the root chamber 206 for discharge at the bottom of the root chamber 206. As shown, the U-shaped frame 200 of the plant structures 102 includes a "cut-out" 230 forming a cradle for the drip line. The drip line is supported in the "cut-outs along the top of the plant structures and water drips into the root chambers through a plurality of drip openings in the drip line 132. A top cap 232 with cut-outs 234 fits over the drip line 132 to cover the top of the root chamber 206 as shown in FIGS. 6A-6C. A valve 239 at an end of the drip line allows for drainage following use. In the embodiment shown in FIG. 6B, a back side of the panels 205 include a plurality of flow features to enhance fluid flow through the root chamber 206.

Figure 7:
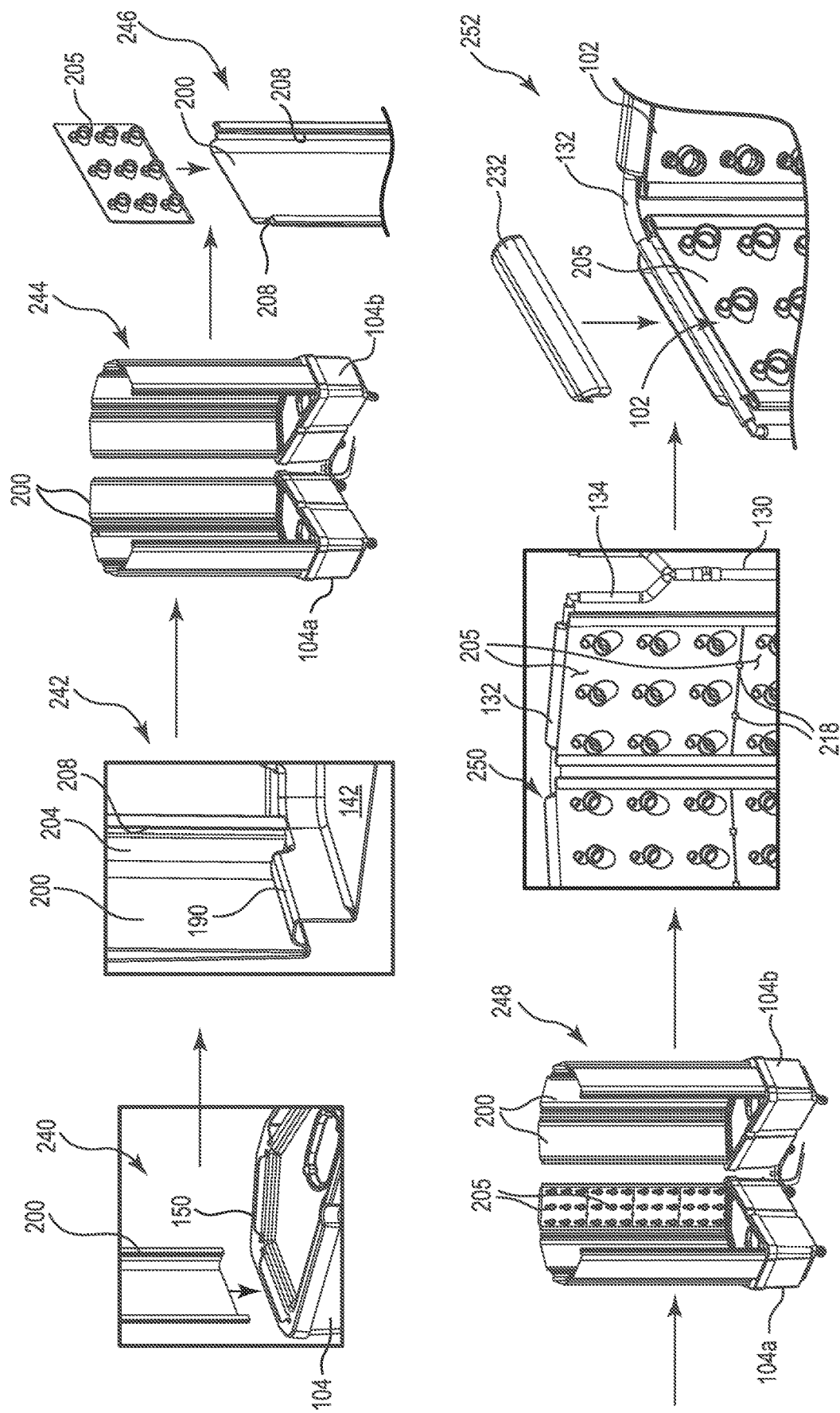
FIG. 7 is a flow chart illustrating method steps of an embodiment of the present application.

FIG. 7 is a flow chart illustrating method steps of an embodiment of the present application. As shown in step 240, U-shaped frames 200 of the plant structures 102 are inserted into tank cavity through openings 150 and an opened bottom end is placed over the support block 190 to connect the plant structure 102 (or U-shaped frame 200) to the support feature as shown in step 242. Steps 240, 242 are repeated for each of the plant structures 102 as shown in step 244. As shown in step 246, plant panels 205 are connected to the U-shaped frames 200. The panels are connected by sliding the sides through the grooves 208 along the sides of the U-shaped frames 200. Step 246 is repeated to insert a plurality of plant panels 205 into each of the U-shaped frames 200 to form the plant wall as shown in step 248. In step 250, the drip line 132 is connected to the irrigation line and the drip line is installed over the top of the root chambers of the plant structures 102 to provide water flow to the root chambers 206. In step 252, top caps 232 are fitted over the opened top of the root chambers 206 and drip line to close the root chambers 206. The tongue and groove and support features (or block 190) allow for assembly of the plant structures 102 to the base structures 104a, 104b or reservoir tanks without various fasteners or other devices to retain the plant structures 102 in the upright position for use.

Figure 8B:
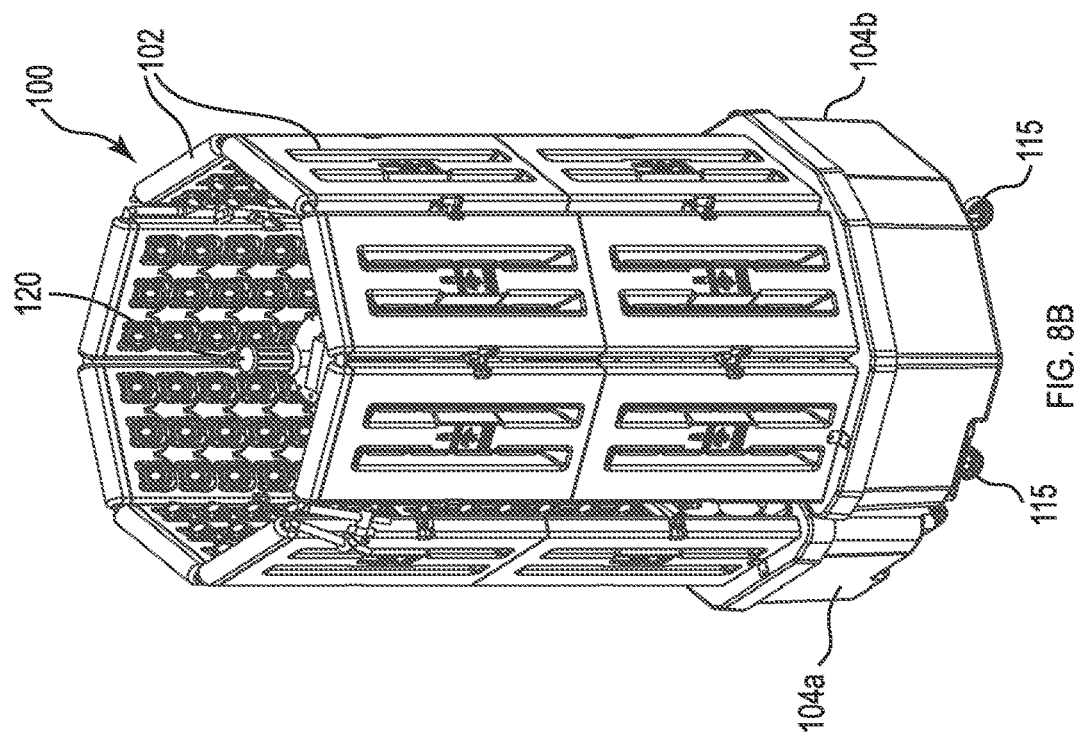
FIGS. 8A-8B illustrate another embodiment of a hydroponic grow assembly of the present application shown in an opened position in FIG. 8A and a closed position in FIG. 8B.
Figure 8A:
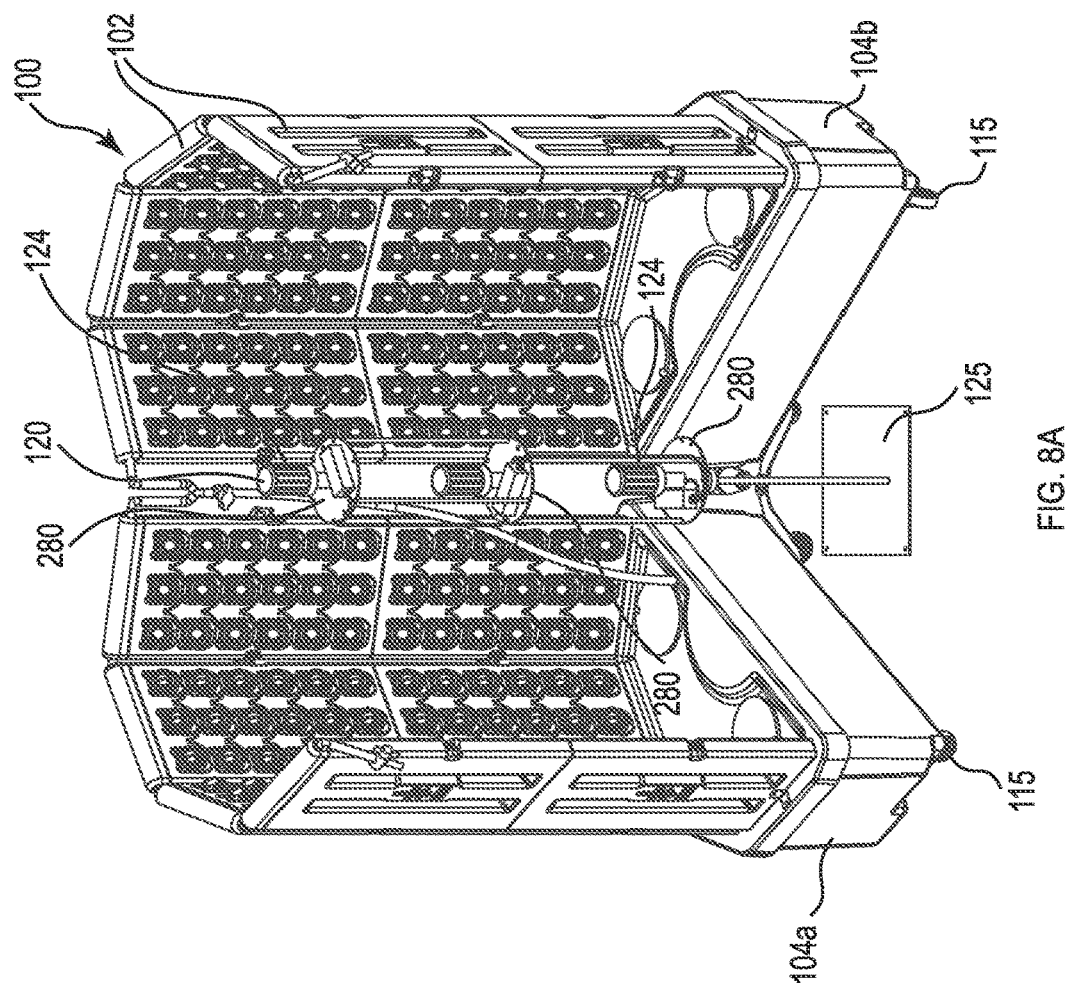
Figure 8D:
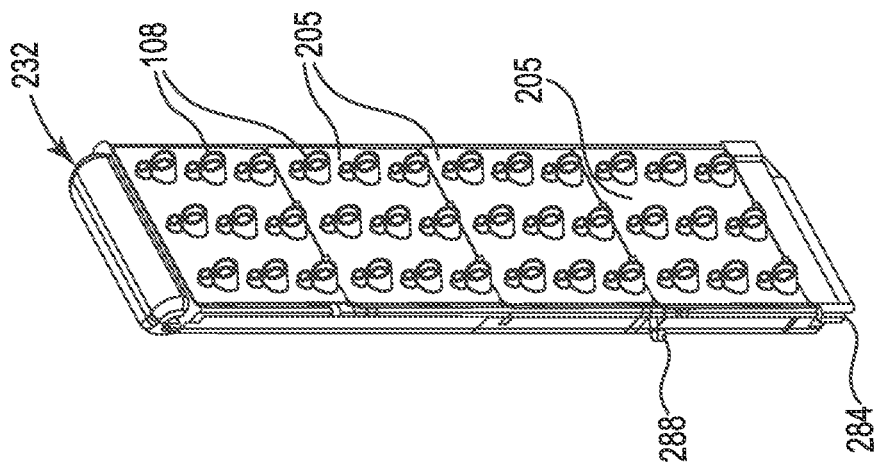
Figure 8C:
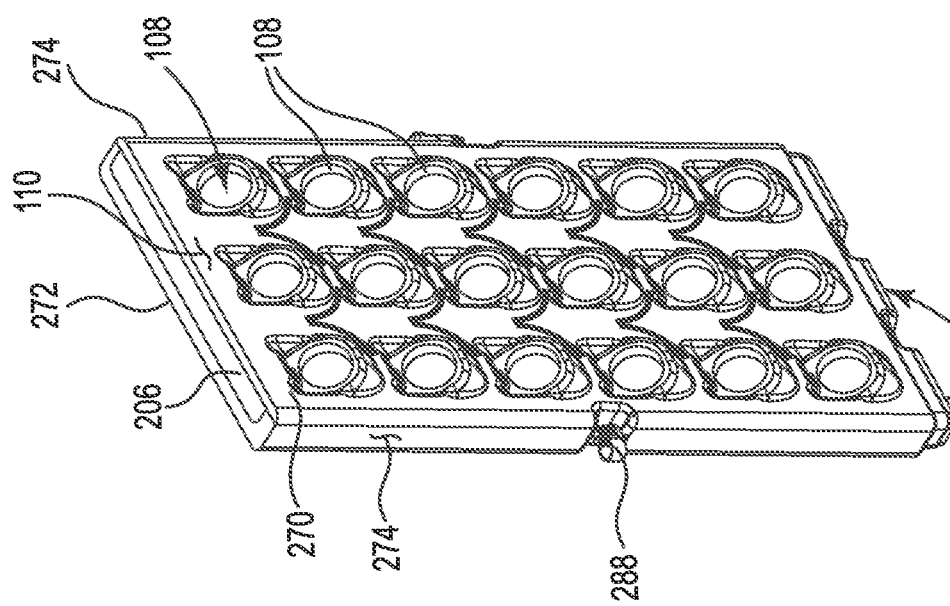
FIG. 8C illustrates an embodiment of a plant structure having connection interface to connect to base structures of the assembly shown in FIGS. 8A-8B.

FIGS. 8A-8B illustrates another embodiment of a grow assembly 100 including plant structures connectable to base structures 104a, 104b. As shown in FIG. 8A-8C, the plant structures include front, back and side walls 270, 272, 274 enclosing root chambers of the plant structures 102 similar, to the previous embodiment. The front wall 270 forms the front 110 of the plant structures 102 and includes the plant wells 108 spaced between the top and bottom of the plant structure 102. The plant wells 108 as shown extend through the front wall 200 and are opened to the root chamber. Water flows through the root chamber 206 and is discharged into the the reservoir tank formed in the base structures 104a, 104b. In the illustrated embodiment the irrigation line 130 is coupled to a drip line assembly including top caps 232 with an integrated drip line that snap fits onto tops of the plant structures 102 as shown in FIG. 8D.

Water from the drip line is discharged back into the reservoir tank to provide a closed water system as previously described. As shown, the light fixture 120 includes a base 125 and a plurality of lighting stages 280 coupled to the base 125 at different height elevations. Lighting elements 124 are coupled to the stages 260 to provide light at the different height elevations. In the embodiment shown in FIG. 8A, the light fixture 120 includes three stages 280 to provide light to the plants on the perimeter plant wall formed via the plant structures 102.

The plant structures 102 are connected to the base structures 104a, 104b via a connection interface or interface structure 284 at the bottom of the plant structures 102 as shown in FIG. 8C which snap fits into openings 150 on the cover for example openings 150 shown in the FIG. 2F. As shown in FIG. 8A various fasteners, such as an L shaped bracket 264 can be used to secure the plant structures 102 to the cover 148 or base structures 104a, 104b for use or a hinged connection is used to connect adjacent plant structures 102 to one another. Multiple plant structures 102 can be stacked depending upon the desired plant wall height via interface structures 284 inserted into opened top ends of the plant structures as shown in FIGS. 8A-8B. FIG. 8E illustrates another embodiment of a plant structure 102 including an interface structure 254 to connect to the base structure. As shown, the plant structure of FIG. 8E incorporates a U-shaped frame 200 and plurality of plant panels 205 similar, to embodiments previously described and a top end is covered via cap 232. As will be appreciated by those skilled in art, alternate embodiment can incorporate one or more of the features or structures described.

While the present application discloses illustrative embodiments, application is not limited to the specific embodiments disclosed and changes and modifications can be made as will be appreciated by those skilled in the art.

What is claimed is:

1. A hydroponic grow assembly comprising:
   an assembly base having a bottom structure enclosed by a perimeter wall to form a reservoir tank and the bottom structure including a support feature within an inner cavity of the reservoir tank; and
   at least one plant structure having a front side, a back side and opposed side walls enclosing a root chamber and the front side including a plurality of plant wells opened to the root chamber to form a plant wall and the plant structure including an opening at a top of the plant structure to provide a flow inlet into the root chamber and a flow outlet at a bottom of the plant structure and the bottom of the plant structure is connectable to the support feature within the inner cavity of the reservoir tank to retain the at least one plant structure in an upright position.

2. The assembly of claim 1 wherein the at least one plant structure includes a U-shaped frame and at least one plant panel removably coupled to the U-shaped frame to form the root chamber of the at least one plant structure and the at least one plant panel includes the plurality of plant wells opened to the root chamber.

3. The assembly of claim 1 wherein the support feature is a raised support block having a length and width sized to interface with an opened bottom end of the plant structure.

4. The assembly of claim 3 wherein the bottom structure includes a plurality of support blocks spaced to support a plurality of plant structures to form the plant wall.

5. The assembly of claim 4 wherein the assembly base includes a cover sized to close the reservoir tank and the cover includes a plurality of spaced openings sized for placement of the plurality of plant structures therethrough and one or more access openings into the reservoir tanks.

6. The assembly of claim 4 wherein the plurality of plant structures include a U-shaped frame and a plurality of plant panels coupled to the U-shaped frame to form root chambers of the plurality of plant structures and the plurality of plant panels each includes a plurality of plant wells opened to the root chamber.

7. The assembly of claim 6 and comprising a contact feature on the plurality of plant panels sized to engage the cover of the reservoir tank to support the plant panels relative to the cover above the bottom structure of the reservoir tank.

8. The assembly of claim 6 wherein the plurality of plant panels are slideably coupled to the U-shaped frame through tongue and groove features on the plurality of plant panels and the U-shaped frame.

9. The assembly of claim 8 wherein the groove feature is formed along side walls of the U-shaped frame and spaced openings on the cover include notched sides to slideably insert the U-shaped frame of the plant structures into the inner cavity of the reservoir tank.

10. The assembly of claim 6 wherein side walls of U-shaped frame include recessed cut-outs to support a drip line proximate to the flow inlet and the assembly includes a cap for closing the top of the plant structures.

11. The assembly of claim 4 wherein the bottom structure includes a raised ledge and the plurality of support blocks are formed along the raised ledge having a back side spaced from the perimeter wall of the reservoir tank to form a slot for a back wall of the plant structure between the perimeter wall and the back side of the support block.

12. The assembly of claim 4 wherein the assembly includes a plurality of assembly bases pivotally connected to form a clam shell structure having an opened position and a closed position and the bottom structure of each assembly base includes the plurality of support blocks to support the plant structures in the upright position.

13. The assembly of claim 12 wherein the assembly further comprises a caster wheel assembly including pivotally connected rails and the plurality of assembly bases of the clam shell structure are supported on the rails to move the bases between the opened position and the closed position.

* * * * *